(12) United States Patent
Schulze et al.

(10) Patent No.: US 7,429,157 B2
(45) Date of Patent: Sep. 30, 2008

(54) OVERRIDEABLE GUIDE AND VERTICAL RESTRAINT FOR AN AIR CARGO SYSTEM

(75) Inventors: Gregory James Schulze, Jamestown, ND (US); Wayne Vernon Huseby, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 212 days.

(21) Appl. No.: 11/248,613

(22) Filed: Oct. 13, 2005

(65) Prior Publication Data

US 2007/0086870 A1   Apr. 19, 2007

(51) Int. Cl.
*B60P 7/08* (2006.01)
(52) U.S. Cl. .............................. 410/69; 410/77; 410/78; 410/80
(58) Field of Classification Search .................. 410/69, 410/70, 77, 78, 80; 244/118.1, 137.1; 248/503
See application file for complete search history.

(56) References Cited

U.S. PATENT DOCUMENTS

| | | | |
|---|---|---|---|
| 3,693,920 A | 9/1972 | Trautman | |
| 3,906,870 A | 9/1975 | Alberti | |
| 4,121,789 A | 10/1978 | Lent et al. | |
| 4,331,412 A | 5/1982 | Graf | 410/69 |
| 4,415,298 A | 11/1983 | Voigt | 410/69 |
| 5,011,348 A | 4/1991 | Jensen et al. | 410/79 |
| 5,265,991 A | 11/1993 | Herrick et al. | 410/69 |
| 5,486,077 A | 1/1996 | Nutting | 410/69 |
| 5,564,654 A | 10/1996 | Nordstrom | |
| 5,573,359 A | 11/1996 | Moradians | 410/69 |
| 5,692,862 A | 12/1997 | Hilde | 410/69 |
| 5,816,758 A | 10/1998 | Huber | 410/77 |
| 5,957,406 A | 9/1999 | Nelson et al. | |
| 6,270,300 B1 | 8/2001 | Huber et al. | 410/69 |
| 6,413,029 B1 * | 7/2002 | Kernkamp | 410/79 |
| 6,450,744 B1 | 9/2002 | Gilhuys et al. | 410/69 |
| 6,485,238 B2 | 11/2002 | Segura | 410/69 |
| 6,896,456 B2 | 5/2005 | Huber | 410/77 |
| 6,926,481 B2 | 8/2005 | Huber | 410/80 |

OTHER PUBLICATIONS

Combined Search and Examination Report under Sections 17 & 18(3), Great Britain Application No. GB061902.6, dated Feb. 5, 2007.
Official Action dated Sep. 6, 207, German Patent Office, Application No. 10 2006 048 405.3-22 (plus English translation).
United Kingdom Search and Examination Report dated Nov. 5, 2007 in GB0719717.1.

* cited by examiner

*Primary Examiner*—Stephen Gordon
(74) *Attorney, Agent, or Firm*—Womble Carlyle Sandridge & Rice, PLLC

(57) ABSTRACT

A centerline restraint includes a conventional center guide/restraint and a pair of a overrideable guide/restraint at either end. Each overrideable guide/restraint is lockable into one of three rotational positions about a common axis: a retracted position, an erect position and an overridden position. The overrideable guide/restraint has a yoke-shaped body with a pair of legs rotatably mounted on an axle which, in turn, is mounted on a base of the centerline restraint. Lift handles, each operatively connected to a spring-loaded plunger are used to adjust the overrideable guide/restraint between the three positions. A head of the spring-loaded plunger abuts one or more stops formed on the legs of the overrideable guide/restraint to lock the overrideable guide/restraint in various predetermined positions. Lift handles operatively connected to the plungers, when operated, cause the overrideable guide/restraint to switch between positions.

16 Claims, 14 Drawing Sheets

US 7,429,157 B2

OVERRIDEABLE GUIDE AND VERTICAL RESTRAINT FOR AN AIR CARGO SYSTEM

CROSS REFERENCE TO RELATED APPLICATIONS

None.

BACKGROUND OF THE INVENTION

The present invention is related to a restraint assembly suitable for mounting on a centerline of an air cargo deck. More particularly, it is directed to such a restraint that is overrideable.

Commercial aircraft carry cargo in large containers and pallets called unit load devices (ULDs). ULDs are available in several different configurations with different lengths and widths. All ULDs must be retained during flight to prevent damage to the aircraft and the cargo.

Cargo aircraft normally carry ULDs that are either 96 inches wide, or 88 inches wide. To accommodate both widths, centerline restraints are mounted along the centerline of the aircraft. The centerline restraints includes a double-headed center guide/restraint located in the center of the centerline restraint to handle 96 inch wide ULDs and a pair of overrideable guide/restraints at opposite ends of the centerline restraint to handle 88 inch wide ULDs.

The overrideable guide/restraints are overrideable in the sense that they are capable of being deflected downwardly to enable an ULD to pass thereover.

On any given flight, a commercial aircraft may carry both 96 inch wide ULDs and 88 inch wide ULDs.

For 96 inch wide ULDs, the ULDs are restrained on one side by a fixed guide/restraint system located near the side wall of the aircraft and on the opposite side by one head of the center guide/restraint. When a 96 inch wide ULD is loaded into the aircraft fuselage and moved forward or aft into position, the ULD may contact and pass over any erect 88 inch overrideable end guide/restraint, forcing them downwards.

For 88 inch wide ULDs, the ULDs will still be restrained on the one side by the fixed guide/restraint system located near the side wall of the aircraft. On the opposite side, however, the ULDs will be restrained by the head of an overrideable guide/restraint belonging to the centerline restraint.

U.S. Pat. No. 5,011,348, in its FIGS. 2 and 3, depict a centerline restraint retaining an 88 inch wide ULD and a 96 inch wide ULD, respectively. The contents the '348 patent are incorporated by reference to the extent necessary to understand the present invention.

SUMMARY OF THE INVENTION

In one aspect, the present invention is directed to an overrideable guide/restraint for an air cargo system. The overrideable guide/restraint comprises a guide body rotatable about a first rotational axis, the guide body having a first side and a second side that are axially spaced apart along the first rotational axis, and a vertical restraint secured to the guide body. In this device, the first side comprises a first channel having first and second stops that are spaced apart from one another, and the second side comprises a second channel having a third stop.

In another aspect, the present invention is directed to a centerline restraint for an air cargo system. The centerline system comprises a base and a first overrideable guide/restraint rotatably mounted on the base along a first rotational axis, wherein the overrideable guide/restraint is rotatable around the first rotational axis between a retracted position, an erect position and an overridden position. When the centerline restraint is mounted on a cargo floor, the overrideable guide/restraint has a sufficiently low profile so as to not interfere with the passing of a unit load device thereover, when the overrideable guide/restraint is in either the retracted position or the overridden position.

DETAILED DESCRIPTION OF THE INVENTION

Figure 1:
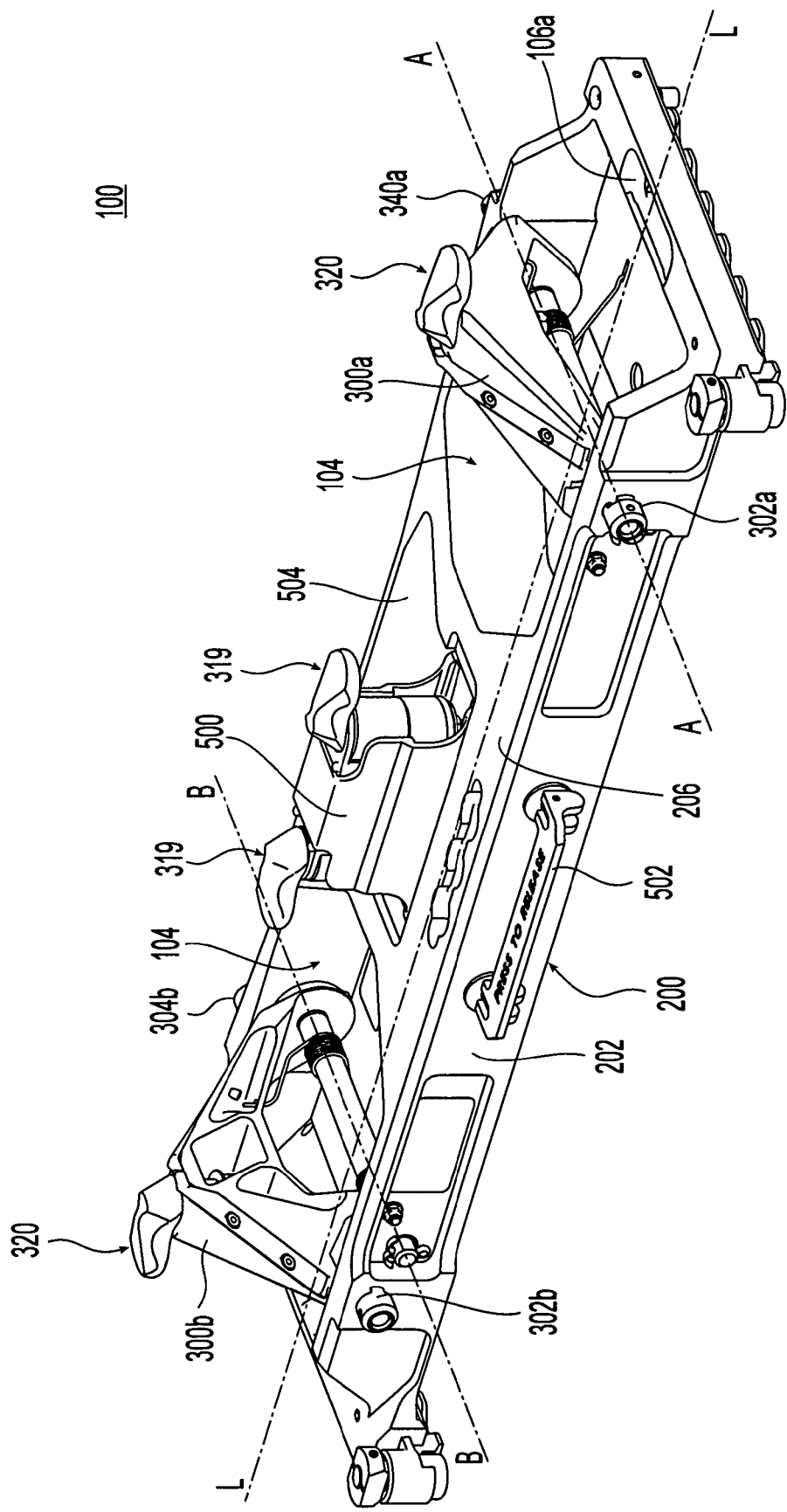
FIG. 1 is a perspective view of a centerline restraint in accordance with the present invention, with the center guide/restraint and the overrideable guide/restraint in the erect position.

Referring generally to FIGS. 1-4, a centerline restraint 100 in accordance with the present invention has a longitudinal axis L extending along a base 200 having base side walls 202, 204 and an upper surface 206.

Mounted in the base 200 is a center guide/restraint 500 for accommodating 96 inch ULDs. The center guide/restraint 500 includes two flipper-style vertical restraints 319 which face in opposite directions. The flipper-style vertical restraints 319 belonging to the center guide/restraint 500 guide a 96 inch ULD in the horizontal direction, and restrain the 96 inch ULD in the vertical direction.

Figure 19:
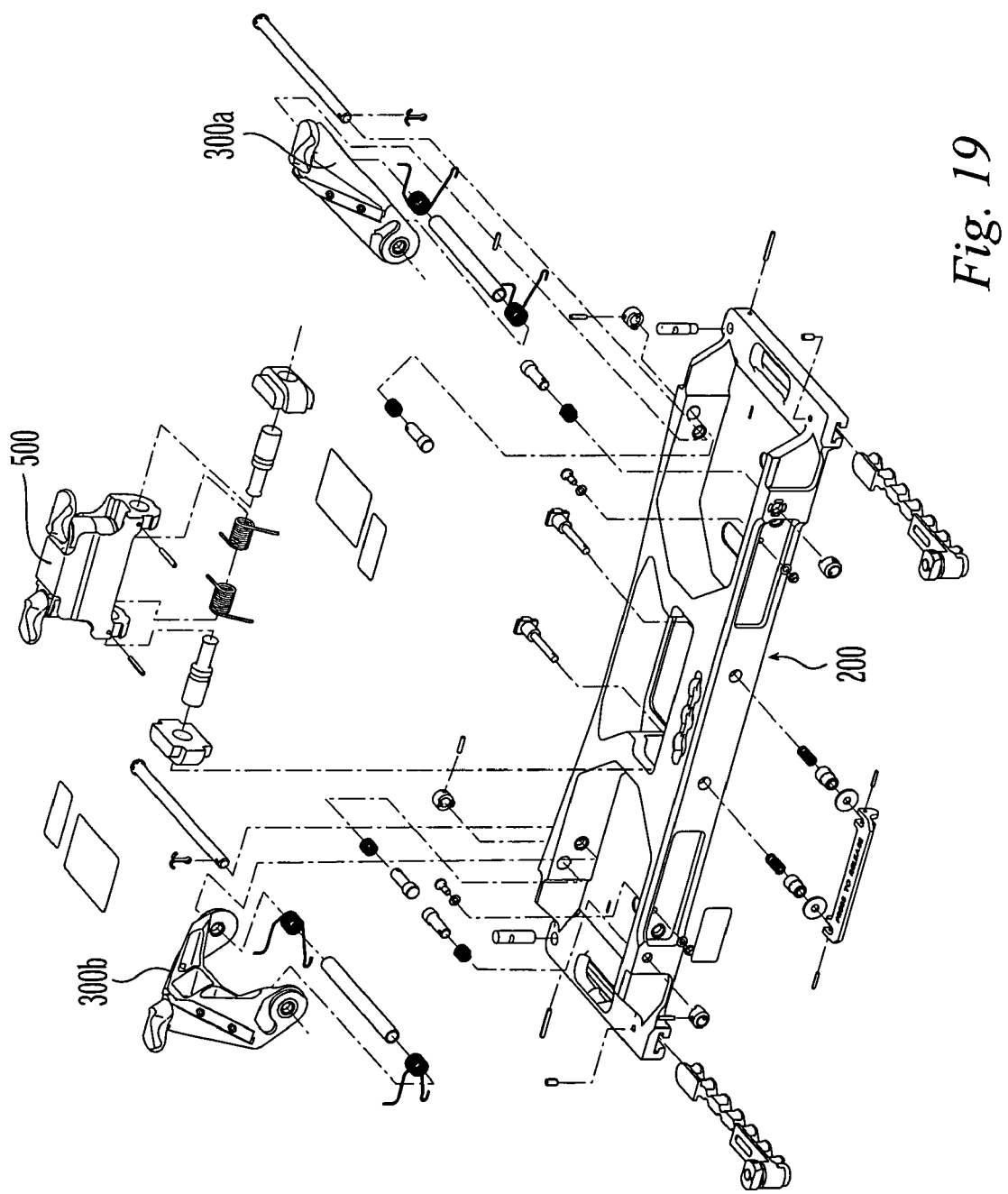
FIG. 19 shows an exploded view of the centerline restraint of FIG. 1.
Figure 20:
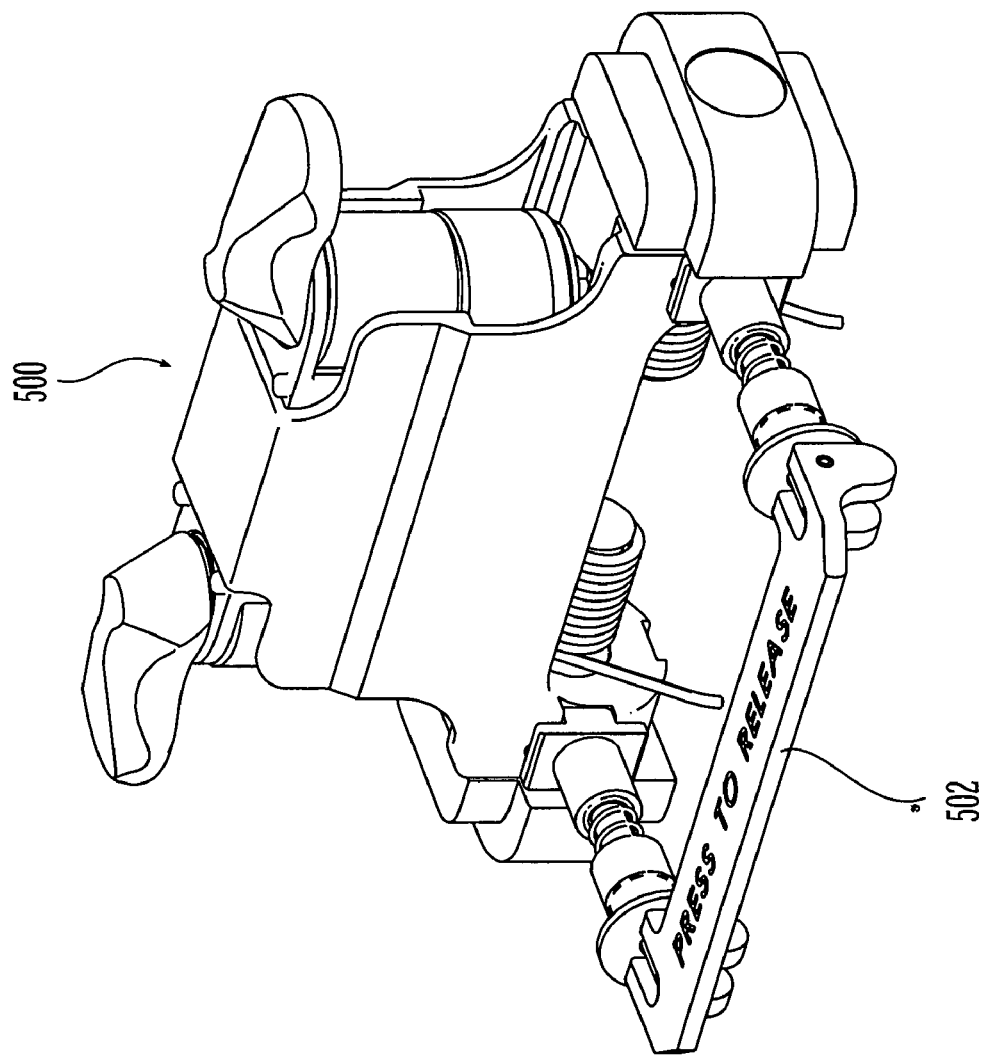
FIG. 20 shows an assembled view of a center guide/restraint assembly of the sort used in the centerline restraint of FIG. 1.
Figure 21:
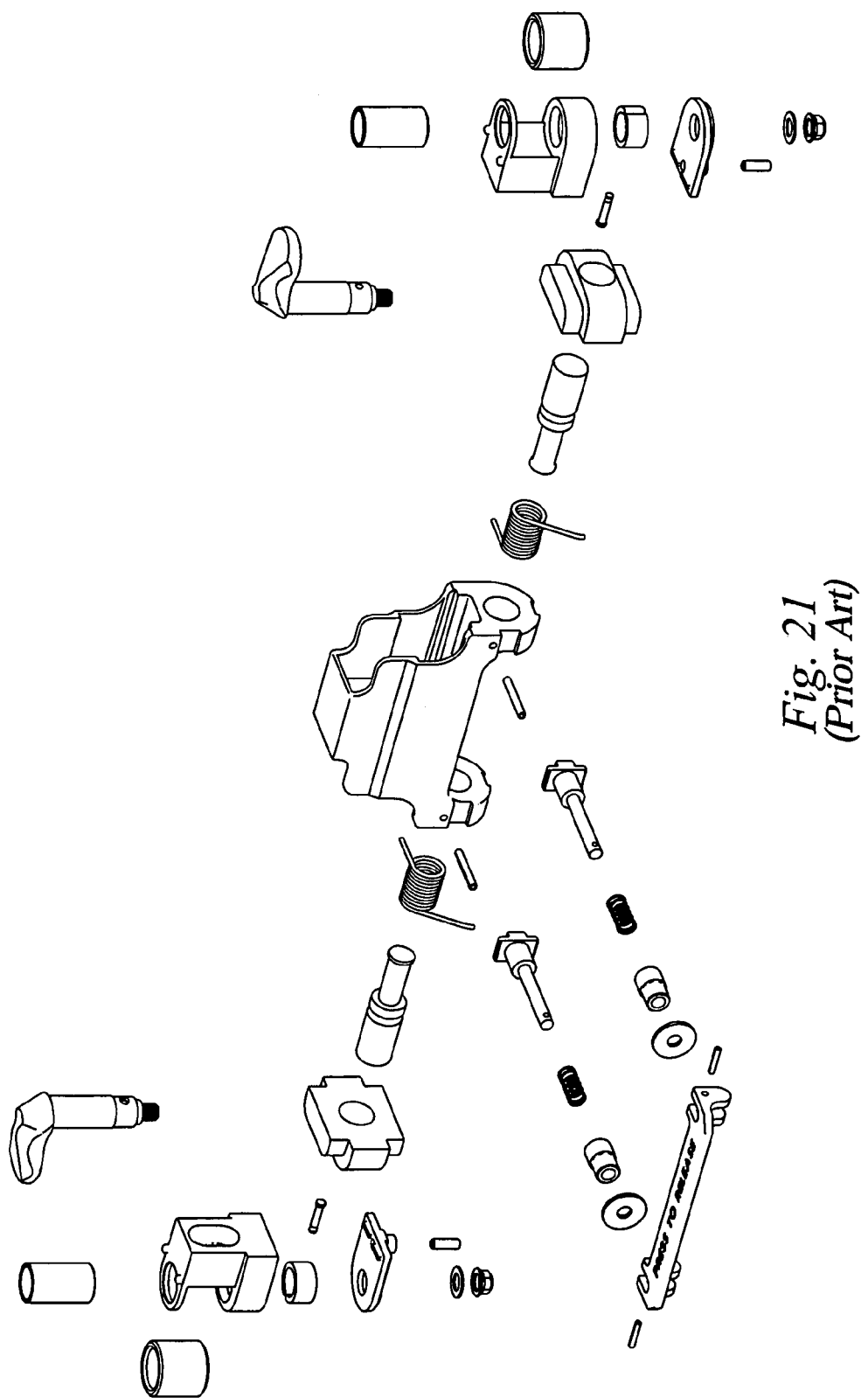
FIG. 21 shows an exploded view of the center guide/restraint assembly of FIG. 20.

The design and operation of the center guide/restraint 500 should be familiar to those skilled in the art. FIG. 19 shows an exploded view of a centerline restraint 100 in accordance with the present invention, including the base 200, the overrideable guide/restraints 300a, 300b discussed below and the known center guide/restraint 500. FIG. 20 shows an assembly of the center guide/restraint 500 together with its operating handle 502 and FIG. 21 shows an exploded view of the assembly of FIG. 20.

Figure 2:
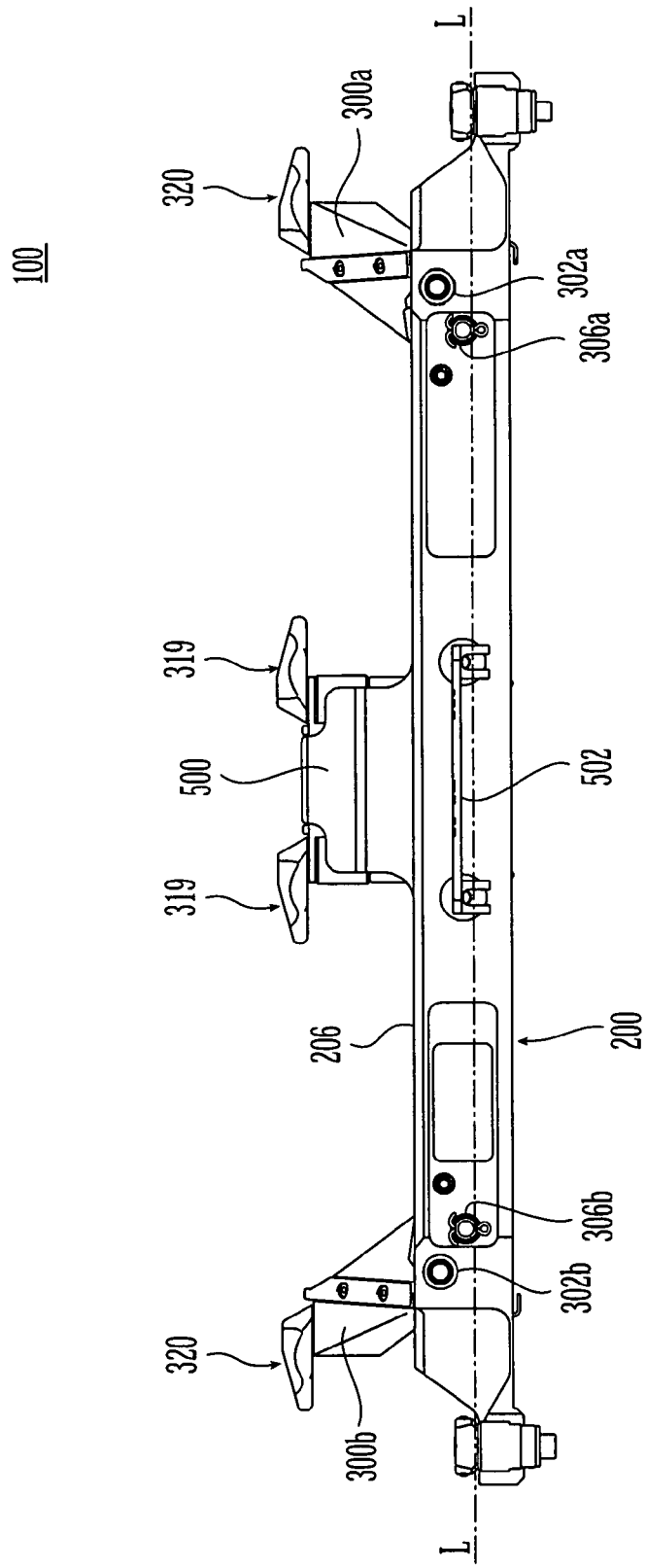
FIG. 2 is a side view of the restraint of FIG. 1.
Figure 3:
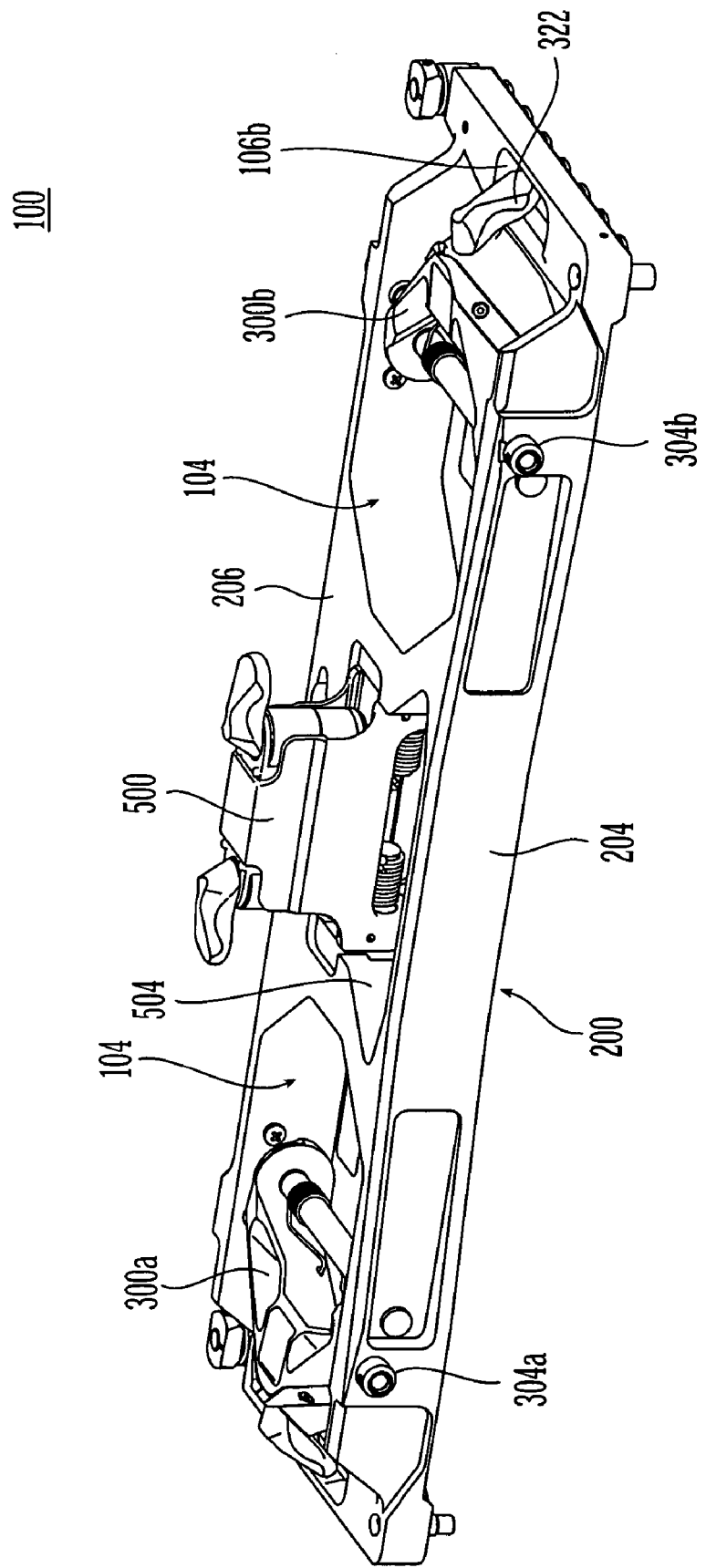
FIG. 3 is a perspective view of the restraint of FIG. 1, but with the overrideable guide/restraint in the overridden position.
Figure 4:
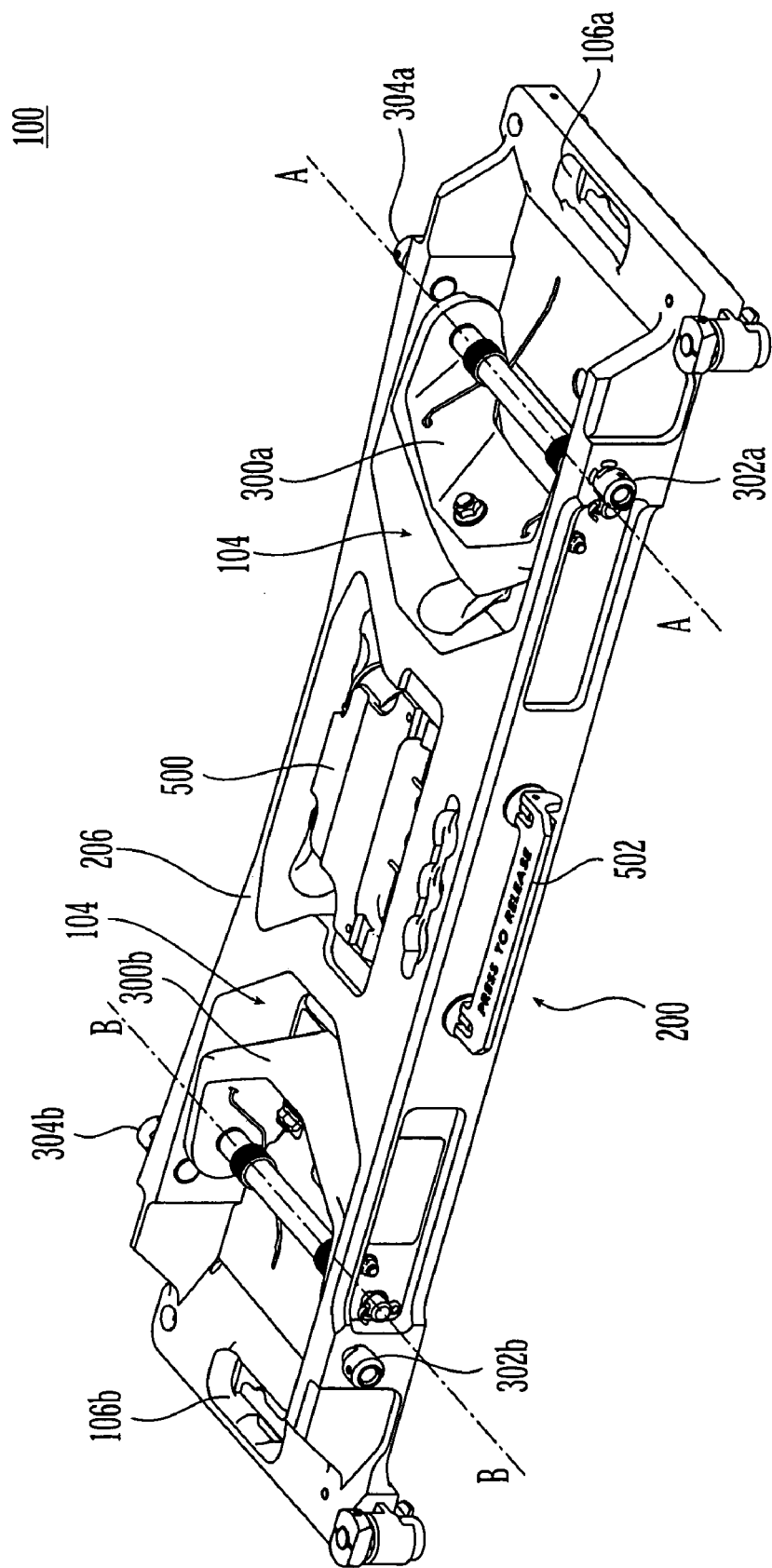
FIG. 4 is a perspective view of the restraint of FIG. 1, but with the center guide/restraint in the retracted position and the overrideable guide/restraint in the retracted.

The center guide/restraint 500 occupies either an erect position, as seen in FIGS. 1-3, or a retracted position, as seen in FIG. 4. A center release handle 502 is used to switch the center guide/restraint 500 between the two positions. Pressing the center release handle 502 unlocks a mechanism that permits rotation of the center guide/restraint 500 about its shaft axis, which is parallel to the longitudinal axis L. To move the center guide/restraint 500 from the erect position to the retracted position, an operator presses the center release handle 502 and rotates the center guide/restraint 500 until its upper portion enters the center guide/restraint cavity 504 formed in the upper surface 206 of the base 200. To move the center guide/restraint 500 from the retracted position to the erect position, an operator again presses the center release handle 502 and this rotates the center guide/restraint 500 upward under spring force until it locks in the erect position.

The centerline restraint of the present invention also includes a pair of overrideable guide/restraints 300a, 300b made in accordance with the present invention.

Figure 5:
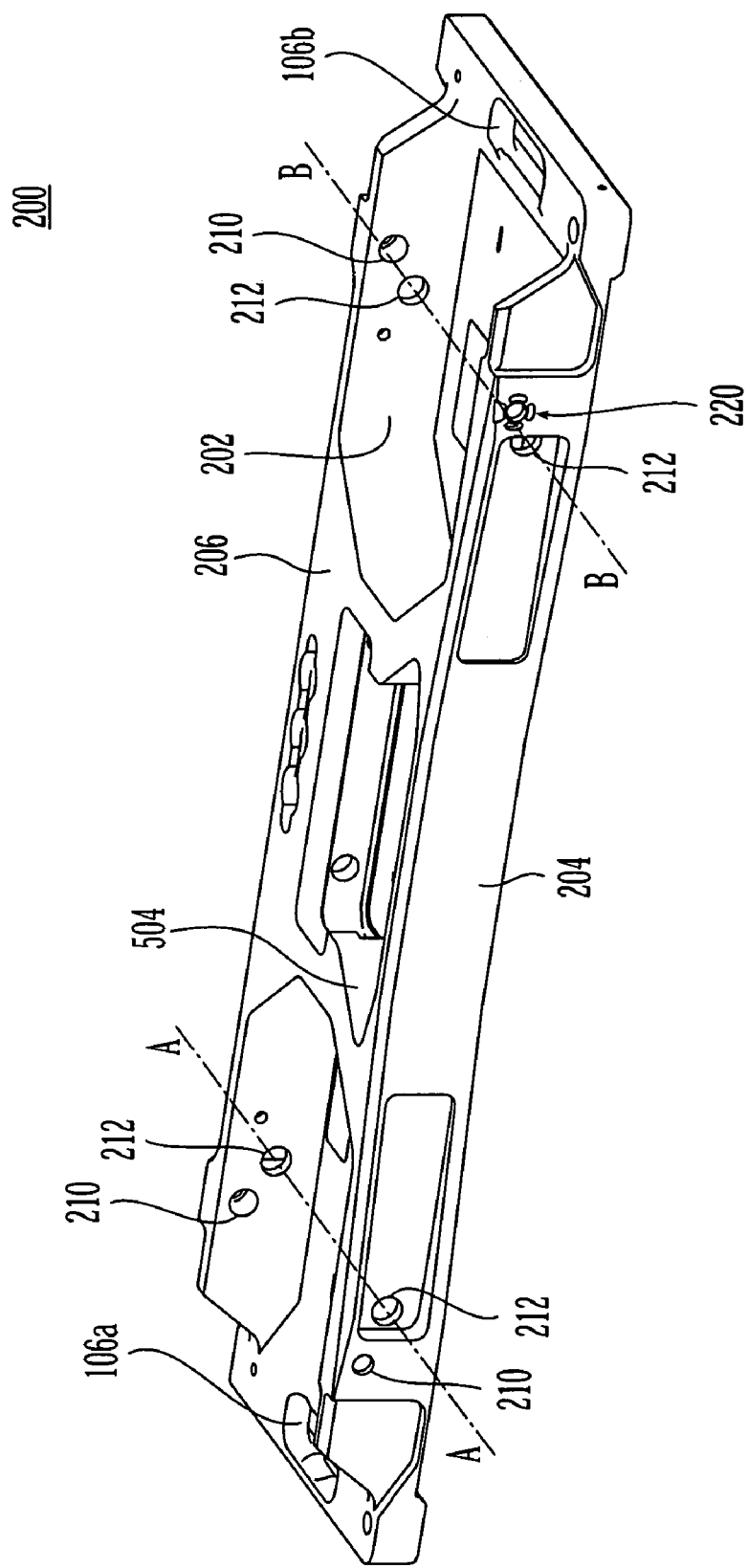
FIG. 5 is a perspective view of the base of the centerline restraint of FIG. 1.

With reference to FIGS. 2 and 4, overrideable guide/restraint 300a has a first axle 306a which rotates about a first rotational axis A while overrideable guide/restraint 300b has a second axle 306b which rotates around a second rotational axis B. Rotational axes A and B are both perpendicular to the centerline restraint's longitudinal axis L. As seen in FIG. 5, the rotational axes A, B pass through holes 212 formed in the side walls 202, 204 of the base 200, the holes 212 being configured to receive and support members forming the axles of the overrideable guide/restraints. Each of the overrideable guide/restraints 300a, 300b may selectively occupy any one of three rotational positions at a time: a retracted position, an erect position and an overridden position, and may be locked in the latter two of these.

FIGS. 1 and 2 show both overrideable guide/restraints 300a, 300b locked in the erect position.

Each overrideable guide/restraint 300a, 300b includes a flipper-style vertical restraint 320, which may or may not be the same as the flipper-style vertical restraint 319 on the center guide/restraint 500. When the centerline restraint 100 is mounted on the centerline of cargo deck, the flipper-style vertical restraints 320 of the overrideable guide/restraints 300a, 300b, when in the erect position, are configured to guide an 88 inch wide ULD in a horizontal direction transverse to longitudinal axis L, and restraint the 88 inch wide ULD in a vertical direction.

FIG. 3 shows both overrideable guide/restraints 300a, 300b locked in the overridden (or "outboard") position. In this position, an end portion of the flipper head 322 of the flipper-style vertical restraint 320 enters a cutout 106a, 106b formed in the base 200. This allows the overrideable guide/restraints 300a, 300b to stay within the footprint of the base 200, even when overridden in an outboard direction.

FIG. 4 shows both overrideable guide/restraints 300a, 300b in the retracted (or "inboard") position. In this position, each of the overrideable guide/restraints 300a, 300b rotates backward around its respective axis A, B, until it lays in its inboard cavity 104, which is formed in the top surface 206 of the base 200.

When the centerline restraint 100 is mounted on a cargo floor, the overrideable guide/restraints 300a, 300b have a sufficiently low profile so as to not interfere with the passing of a unit load device thereover, when the overrideable guide/restraints 300a, 300b are in either the retracted position or locked down in the overridden position.

It should be evident from the foregoing discussion with respect to FIGS. 1-4 that the center guide/restraint 500 and each of the overrideable guide/restraints 300a, 300b can be moved among their various positions independently of each other.

Overrideable guide/restraint 300a is rotated from the locked, overridden position of FIG. 3 to the locked erect position of FIGS. 1 and 2 by pulling only on lift handle 302a in an outward direction, in a direction opposite the longitudinal axis L. When only the lift handle 302a is pulled, the overrideable guide/restraint 300a rotates in the direction of the center guide/restraint 500 under torsional spring force, and comes to rest in the erect position.

Overrideable guide/restraint 300a is rotated from the erect position of FIG. 1 to the retracted position of FIG. 4 by simultaneously pulling both lift handles 302a, 304a in an outward direction, in a direction opposite the longitudinal axis L. When both lift handles 302a, 304a are pulled, overrideable guide/restraint 300a rotates backwards in the direction of the center guide/restraint 500 from the erect position under torsional spring force, and comes to rest in the inboard cavity 104. It should be noted here that pulling both lift handles 302a, 304a from the overridden position also results in the overrideable guide/restraint 300a coming to rest in the retracted position.

Similarly, overrideable guide/restraint 300b is raised from the locked, overridden position of FIG. 3 to the erect position of FIGS. 1 and 2 by pulling only on lift handle 304b; and overrideable guide/restraint 300b is rotated from the erect position of FIG. 1 to the retracted position of FIG. 4 by simultaneously pulling on both lift handles 302b, 304b.

As discussed further below with respect to FIGS. 7-18, the lift handles 302a, 302b, 304a, 304b are operatively connected to a spring-biased plunger 382 that is inwardly biased in the direction of the longitudinal axis L. Pulling on a lift handle withdraws a head 384 of the plunger 382 from abutment against a stop 372, 377, 379 formed on a corresponding overrideable guide/restraint. This frees that corresponding overrideable guide/restraint, under force of one or more torsion springs 334, 336, to rotate in the direction of the retracted position.

In the opposite direction, rotation from the retracted position to the erect position for both overrideable guide/restraints 300a, 300b is done manually. Rotation from the erect position to the overridden position can also be accomplished manually, though more typically takes place when a ULD passes over the overrideable guide/restraint.

The overrideable guide/restraints 300a, 300b have identical structure and operation, and so from this point forward, the structure and operation of only one of these, 300a, will be explained.

Figures 7, 7A:
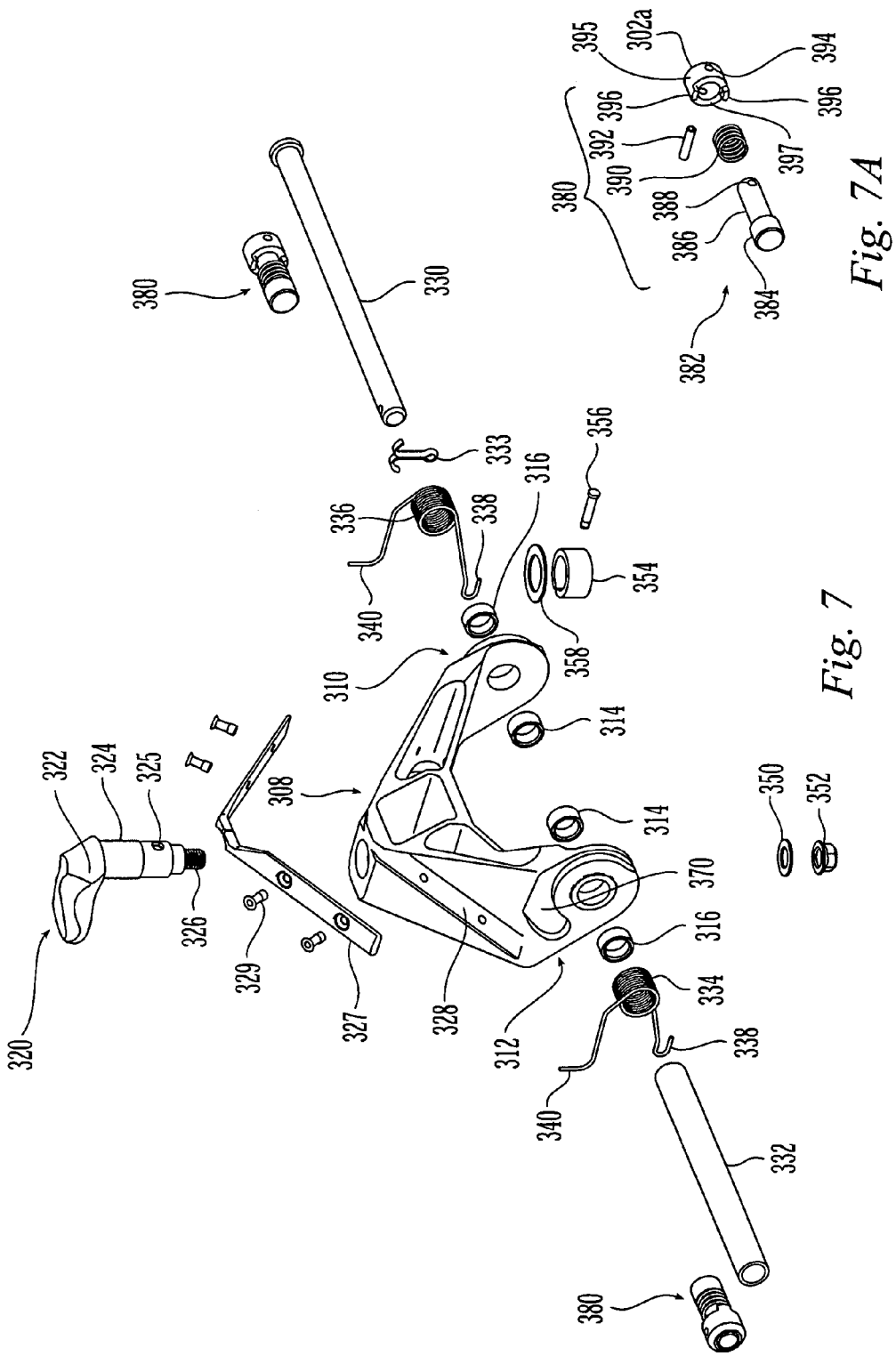
FIG. 7 is an exploded view of overrideable guide/restraint.
FIG. 7A is an exploded view of a lift handle assembly seen in FIG. 7

FIG. 7 shows an exploded view of an overrideable guide/restraint 300a of the sort seen in the earlier figures.

The overrideable guide/restraint comprises a yoke-shaped guide body 308 having a first leg 310 and a second leg 312. The guide body is rotatable around a rotational axis (e.g., rotational axis A) and the legs 310, 312 are axially separated from one another along the rotational axis. A channel 370, discussed further below, can be seen in the second leg 312. Mated to the body 308 is a flipper-style vertical restraint 320. The flipper-style vertical restraint 320 comprises a restraint head 322 to which is attached a restraint shank 324.

A through bore 325 is formed in the restraint shank 324 to accept a dowel pin 356. A washer 358 and a leaf spring 354 are mounted around a lower portion of the restraint shank 324, within the guide body 308. Opposing edges of the leaf spring 354 are separated by an end of the dowel pin 356. The dowel pin 356, which rotates with the restraint shank 324, is used as an actuator to abut and rotate the opposing edges of leaf spring 354. Thus, when the restraint head 322 tunis in a first direction, the dowel pin 356 turns in the same direction, compressing the leaf spring 354 and creating a restoring force that urges the vertical restraint 320 towards its neutral position within the guide body 308. People skilled in the art are familiar with using such actuators and leaf springs in the art of implementing vertical restraints.

The terminal end of the restraint shank 324 is provided with a threaded member 326. A washer 350 and nut 352 are used in conjunction with the threaded member 326 to secure the vertical restraint 320 to the guide body 308.

A wear strip 327 is attached to a wear strip mounting surface 328 of the guide body 308 by screws 329. The wear strip 327 helps protect the upper surface of the overrideable guide/restraint 300a from ULDs and other objects that may bump into it. Thus, the wear strip 327 is typically made from a harder material than the guide body 308.

The overrideable guide/restraint 300a is rotatably mounted on the base 200. A pin 330 is configured to support the overrideable guide/restraint 300a. The pin 330 is threaded through a pair of openings 212 formed on the sides 202, 204 of the base, across from one another. A cotter pin 333 passing through a through hole formed at one end of the pin 330 and secures the pin to the base 200.

A portion of the pin 330 is covered by a sleeve 332. The sleeve 332 is configured to rotate on a first pair of bushings 314 implanted in circular openings formed in the legs 310, 312, and a second pair of bushings 316 mounted in the holes 212. A pair of torsion springs 334, 336 are mounted on the sleeve 332. A first torsion spring end 338 anchors the spring 334, 336 to a hole formed the base 200 while a second torsion spring end is anchored to a hole formed on a surface of the overrideable guide/restraint itself. Thus, when the overrideable guide/restraint is rotated, the springs 334, 336 provide a torsional spring force that urges the overrideable guide/restraint 300a back towards the retracted position.

FIG. 7A shows an exploded view of the lift handle assembly 380 seen in FIG. 7. The lift handle assembly 380 includes a lift handle 302a, a plunger 382, a coil spring 390 and a plunger pin 392.

The lift handle 302a has the same structure as the other lift handles 304a, 302b, 304b seen in the figures. The lift handle 302a comprises a cup-shaped hollow body 395 with a rim 397, and a pair of axially extending projections 396 formed on the rim 397 and diametrically across from one another. The lift handle 302a also includes a pair of handle through bores 394 formed in the body for receiving a plunger pin 392.

The plunger 382 comprises an enlarged head portion 384 connected to a cylindrical shaft 386. The head portion 384 is configured and dimension to travel along a channel formed in the overrideable guide/restraint. At the far end of the shaft 386, opposite from the head 384, is a pair of shaft through bores 388.

When the lift handle assembly 380 is being assembled, the coil spring 390 is mounted over the plunger shaft 386 and the plunger shaft is inserted through an opening 210 (see FIG. 6) formed in a side wall 202 of the base 200. The far end of the shaft 386 is then inserted into the hollow body 395 of the lift handle 302a with the handle through bores 394 and the plunger through bores 388 aligned Finally, the plunger pin 392 inserted in the through bores to secure the lift handle 302a to the plunger 382.

When so assembled, the coil spring 390 biases apart the lift handle 302a and the plunger 382. Pulling on the lift handle 302a in an outward direction draws the plunger 382 in a direction away from the longitudinal axis L and towards the side wall 202 of the base 200. It also causes the coil spring 390 to compress against an inner surface of the side wall 202, thereby creating a restoring force that urges the plunger 382 back towards the longitudinal axis L.

Figure 8:
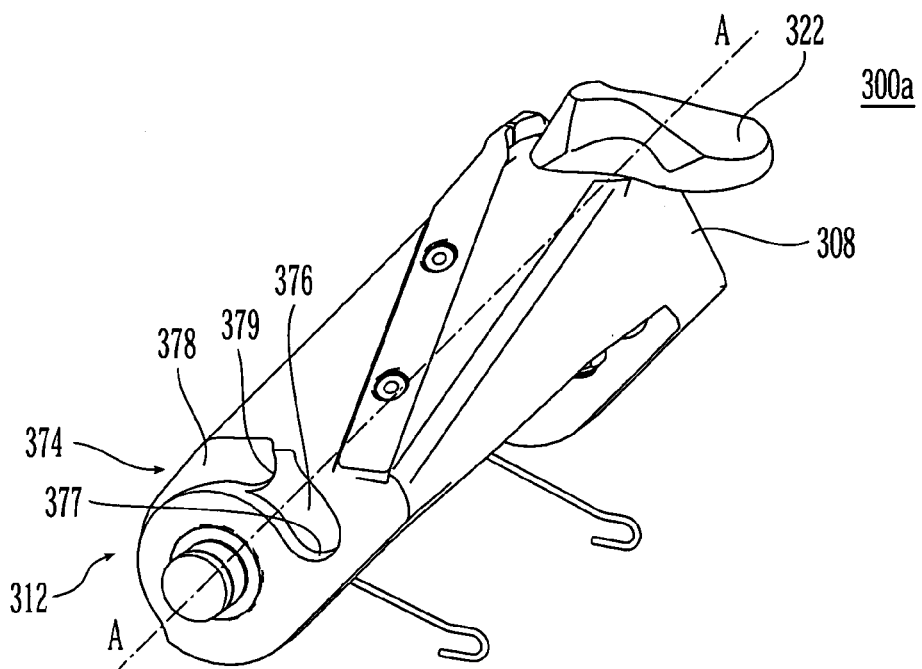
FIG. 8 shows a second perspective view of an assembled overrideable guide/restraint showing the second leg having the dual depth channel.

FIG. 8 shows a perspective view of the overrideable guide/restraint 300a in the erect position with the first leg or side 310 of the body 308 visible. A first channel 374 is formed along this first side 310. The first channel 374 includes a shallow first track 376 terminating in a first plunger stop 377. Communicating with the shallow track 376 is a deep second track 378 terminating in a second plunger stop 379. The second plunger stop 379 is farther inward along rotational axis A than the first plunger stop 377. Thus, the first side 310 of the body 308 is provided with two rotational stops 377, 379 which are at different axial depths and positioned at different portions of the first channel 374, and thus are spaced apart from one another both rotationally and axially.

Figure 9:
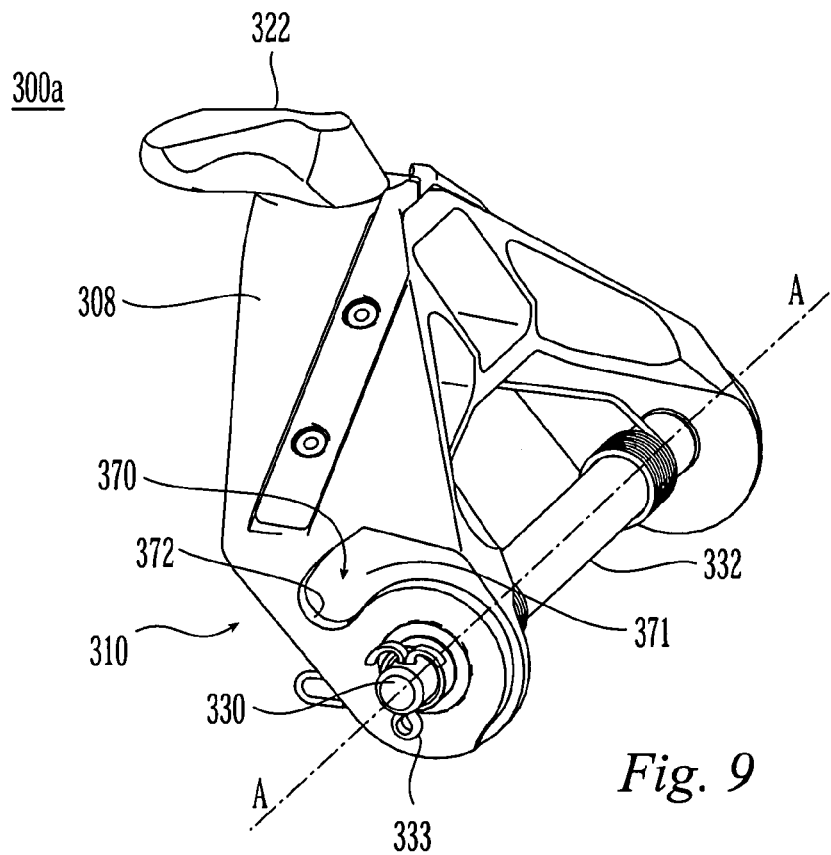
FIG. 9 shows a first perspective view of an assembled overrideable guide/restraint showing the first leg having the single depth channel.

FIG. 9 shows a perspective view of the overrideable guide/restraint 300a in the erect position with the second leg or side 312 of the body 308 visible. A second channel 370 is formed along this second side 312. The second channel 370 comprises a shallow third track 371 terminating in a third plunger stop 372. The shallow third track 371 and the shallow first track 376 have approximately the same depth. Similarly, the third plunger stop 372 and the first plunger stop 377 are approximately the same distance inward along the rotational axis A from their respective sides. Thus, the second side 312 of the body 308 is provided with a single rotational stop 372 at the same axial depth as the first plunger stop 377. Furthermore, the two sides of the guide body are axially separated from one another along the rotational axis A.

Figure 10:
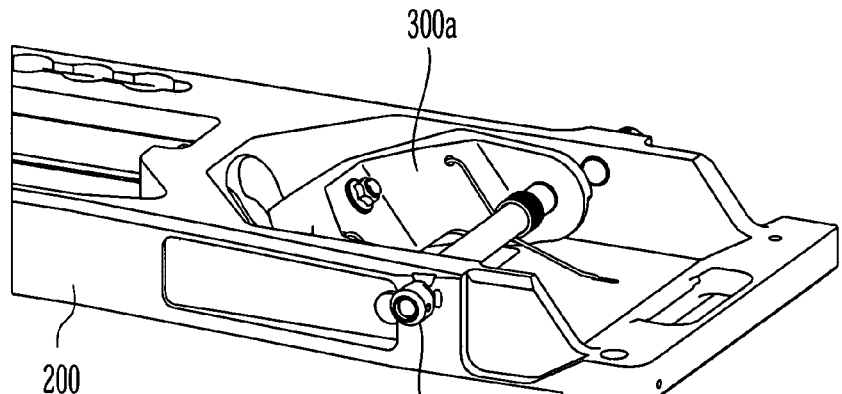
FIG. 10 shows one end of the centerline restraint of FIG. 1 with the overrideable guide/restraint in the retracted position.
Figure 11:
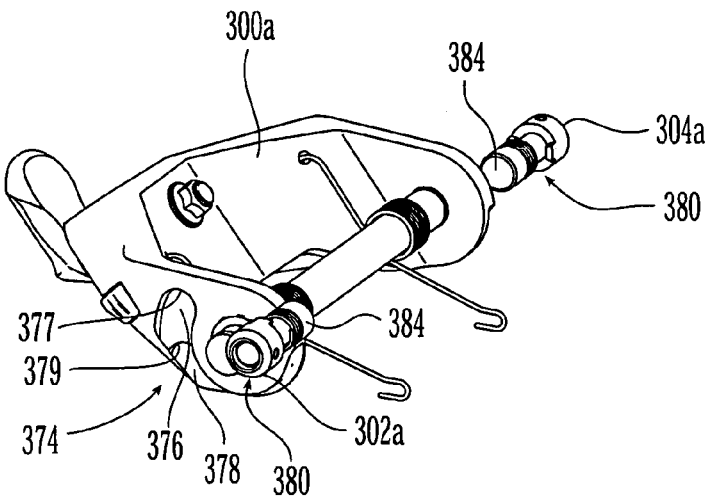
FIG. 11 shows only the plunger assembly and the overrideable guide/restraint in the retracted position with the second leg visible.
Figure 12:
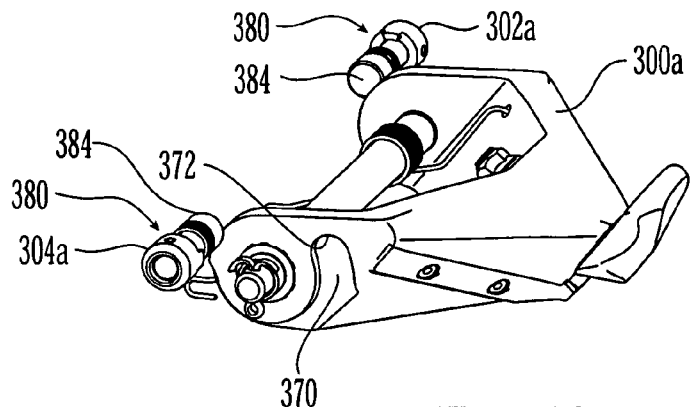
FIG. 12 shows only the plunger assembly and the overrideable guide/restraint in the retracted position with the first leg visible.

FIGS. 10, 11 and 12 all show the overrideable guide/restraint 300a in the retracted position. FIG. 10 shows this in the context of the centerline restraint of FIG. 1. FIGS. 11 and 12 show the overrideable guide/restraint 300a with the base 200 removed and the lift handles 302a, 304a and the lift handle assemblies 380 left in place to show their relationship to the first channel 374 (FIG. 11) and the second channel 370 (FIG. 12). FIG. 11 shows the overrideable guide/restraint 300a from the same perspective as FIG. 10. As seen in FIGS. 11 and 12, when the overrideable guide/restraint 300a is in the retracted position, the lift handle assemblies 380 (and thus the plunger heads 384) on either side are free and clear of the first channel 374 and the second channel 370. Since no plunger head 384 abuts any of the stops 372, 377 or 379, the overrideable restraint/guide 300a, under a torsional spring bias urging it towards the retracted position, rests in the cavity 104.

Figure 13:
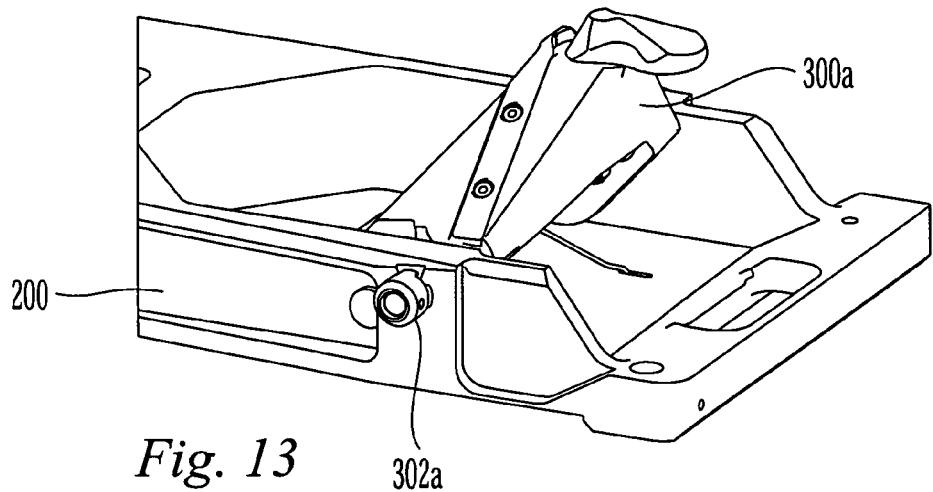
FIG. 13 shows one end of the centerline restraint of FIG. 1 with the overrideable guide/restraint in the erect position.
Figure 14:
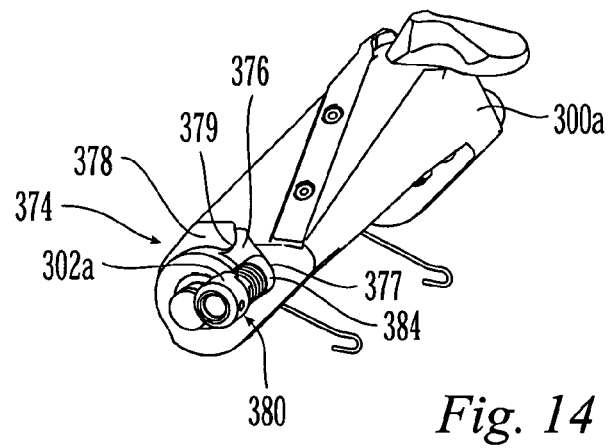
FIG. 14 shows only the plunger assembly and the overrideable guide/restraint in the erect position with the second leg visible.
Figure 15:
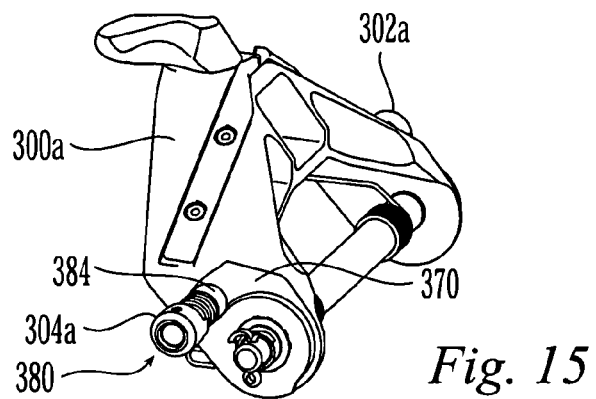
FIG. 15 shows only the plunger assembly and the overrideable guide/restraint in the erect position with the first leg visible.

FIGS. 13, 14 and 15 all show the overrideable guide/restraint 300a in the erect position. FIG. 13 shows this in the context of the centerline restraint of FIG. 1. FIGS. 14 and 15 show the overrideable guide/restraint 300a with the base 200 removed and the lift handles 302a, 304a and the lift handle assemblies 380 left in place to show their relationship to the first channel 374 (FIG. 14) and the second channel 370 (FIG. 15). FIG. 14 shows the overrideable guide/restraint 300a from the same perspective as FIG. 13. As seen in FIG. 14, the plunger head 384 associated with lift handle 302a is positioned in the shallow first track 376 of the first channel 374 and abuts the first plunger stop 377 of the first channel 374. As seen in FIG. 15, the plunger head 384 associated with lift handle 304a is positioned in second channel 370 and abuts the third stop 372 (not shown). Since the plunger heads 384 associated with both lift handles 302a, 304a abut stops 377, 372, the overrideable restraint/guide 300a, despite the torsional spring bias urging it towards the retracted position, remains erect.

Figure 16:
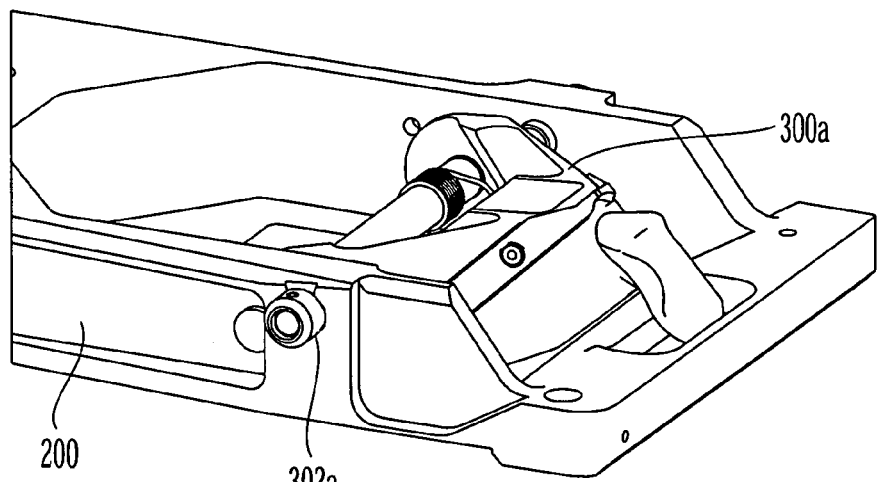
FIG. 16 shows one end of the centerline restraint of FIG. 1 with the overrideable guide/restraint in the overridden position.
Figure 17:
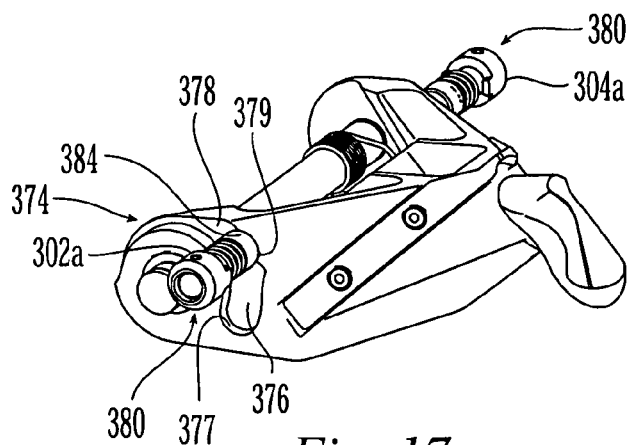
FIG. 17 shows only the plunger assembly and the overrideable guide/restraint in the overridden position with the second leg visible.
Figure 18:
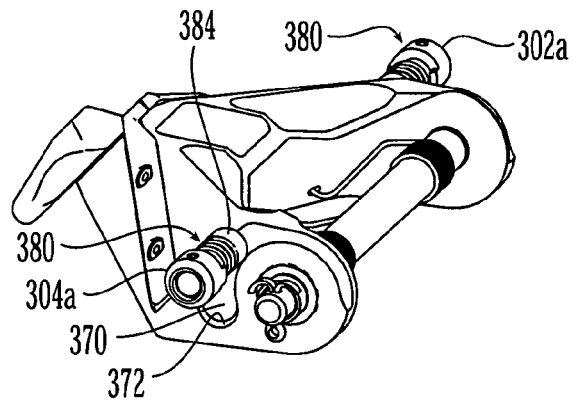
FIG. 18 shows only the plunger assembly and the overrideable guide/restraint in the overridden position with the first leg visible.

FIGS. 16, 17 and 18 all show the overrideable guide/restraint 300a in the overridden position. FIG. 16 shows this in the context of the centerline restraint of FIG. 1. FIGS. 17 and 18 show the overrideable guide/restraint 300a with the base 200 removed and the lift handles 302a, 304a and the lift handle assemblies 380 left in place to show their relationship to the first channel 374 (FIG. 17) and the second channel 370 (FIG. 18). FIG. 17 shows the overrideable guide/restraint 300a from the same perspective as FIG. 16. As seen in FIG. 17, the plunger head 384 associated with lift handle 302a is positioned in the deep second track 378 of the first channel 374 and abuts the second plunger stop 379 of the first channel 374. As seen in FIG. 18, the plunger head 384 associated with lift handle 304a is positioned in the middle of second channel 370 and does not abut the third stop 372. Since the plunger head 384 associated with lift handle 302a abut stop 379, the overrideable restraint/guide 300a, despite the torsional spring bias urging it towards the retracted position, remains in the overridden position.

The overridden position may be realized when an ULD passes over an overrideable restraint/guide 300a from behind when in the erect position. In the preceding discussion, the overrideable restraint/guide 300a becomes locked in the overridden position when the plunger head 384 associated with the lift handle 302a abuts the axially inward stop 379 associated with the deep second track 378.

This "locking" function may selectively be disabled, thereby allowing the overrideable restraint/guide 300a to spring back up to the erect position, each time it is temporarily forced downward into the overridden position. Selective disablement is facilitated by a detent cluster 220 (See FIGS. 5 and 6) formed around the hole 210 associated with lift handle 302a.

Figure 6:
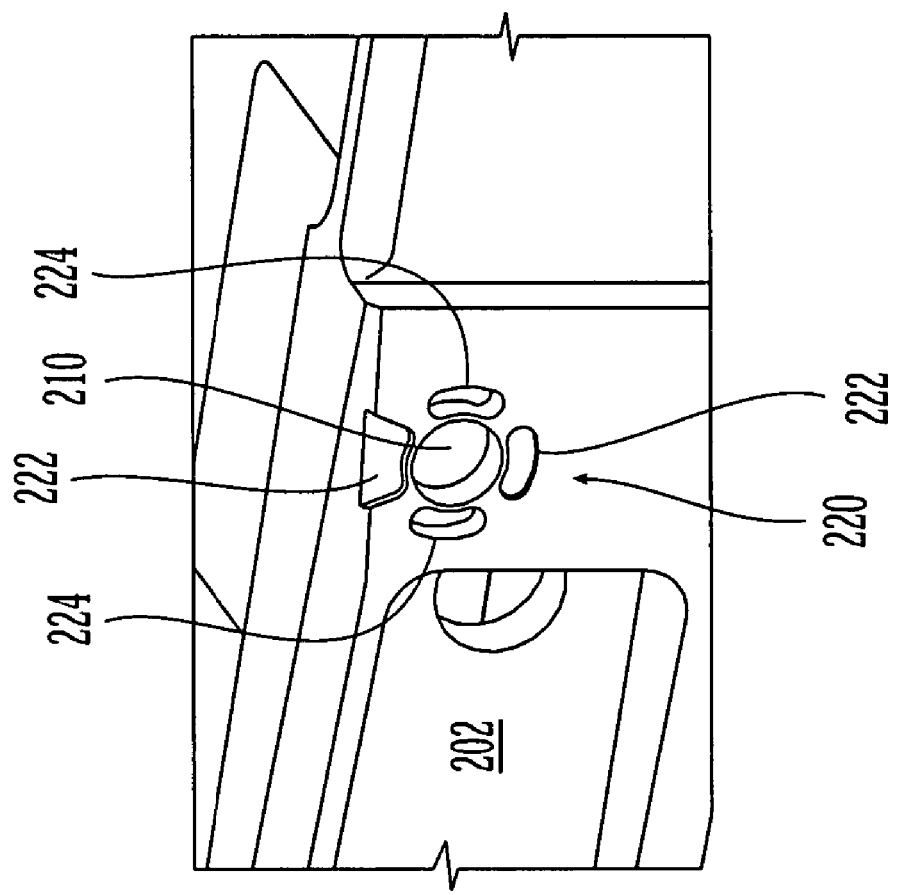
FIG. 6 is a detailed view of the detent cluster surrounding a plunger hole in a side of the base.

As best seen in FIG. 6, the detent cluster 220 comprises two pairs of detents 222, 224. Rotationally about the hole 210, the members from each pair are 180° apart, and adjacent detents are 90° apart. The first pair of detents 222 have a first depth in the side wall 202 and the second pair of detents 224 have a second depth in the side wall, the second depth being deeper than the first depth.

As discussed above with respect to FIG. 7A, the cup-shaped hollow body 395 of the lift handle 302a has a rim 397 provided with a pair of axially extending projections 396. The diameter of the rim 397 is approximately the same as the spacing between members of either pair of detents. The axially extending projections 396 likewise have substantially the same spacing, and so may be inserted into either pair of detents 222, 224.

When the axially extending projections 396 are inserted into the second pair of detents 224 (the deeper pair), the lift handle 302a can be positioned closer to the first channel 374 of the overrideable restraint/guide 300a and so its associated plunger head 384 is capable of entering the deep second track 378 and abutting the second plunger stop 379. In such case, when the overrideable restraint/guide 300a is forced from the erect position to the overridden position, the associated plunger head 384 abuts the second plunger stop 379 and locks the device in the overridden position.

On the other hand, when the axially extending projections 396 are inserted into the first pair of detents 222 (the shallower pair), the lift handle 302a is positioned slightly farther from the first channel 374 of the overrideable restraint/guide 300a and so its associated plunger head 384 is no longer capable of entering the deep second track 378 or abutting the second plunger stop 379. In such case, when the overrideable restraint/guide 300a is forced from the erect position to the overridden position, the associated plunger head 384 does not abut the second plunger stop 379 and so the device returns to the erect position from the overridden position, once the ULD or other object no longer pushes down the overrideable restraint/guide 300a.

It can be seen from the foregoing, then, that one may selectively enable or disable locking in the overridden position simply by (a) slightly pulling out the lift handle 302a until its projections 396 clear the pair of detents 222, 224 they were occupying, (b) rotating the lift handle by 90°, and (c) allowing the projections 396 to enter the other pair of detents 224, 222.

The centerline restraint of the present invention provides lateral and vertical restraint of 88 inch wide ULDs and also 96 inch ULDs.

As seen from the above description, in the centerline restraint of the present invention, the overrideable guide/restraint has a constant axis of rotation which does not move laterally along the longitudinal axis of the centerline restraint. The overrideable guide/restraint is thus able to pivot in place between a retracted position, an erect position and an overridden position. This contrasts with prior art designs in which a sliding mechanism is needed to laterally translate the axis of the overrideable guide/restraint along the longitudinal axis. Furthermore, in the centerline restraint of the present invention, the overrideable guide/restraint can selectively be configured to either (a) lock in place once forced into the overridden outboard position, or (b) spring back up after being temporarily forced into the overridden outboard position.

Another feature of the present invention is that when the overrideable guide/restraint is in the overridden outboard position, no portion of the overrideable guide/restraint extends past the footprint of the base. This contrasts with prior art devices that require additional clearance between the parts, which could create regions of reduced strength in the centerline restraint.

Finally, in the centerline restraint of the present invention, the flight load is reacted into the vertical walls of the base through the retractable plungers and pin mount. This contrasts with prior art designs in which the loads are reacted into the bottom of the base, oftentimes necessitating a thicker base.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A centerline restraint for an air cargo system, comprising:
   a base having a longitudinal axis (L); and
   a first overrideable guide/restraint rotatably mounted on the base along a first rotational axis (A); wherein:
   the first overrideable guide/restraint is rotatable around the first rotational axis between a retracted position, an erect position and an overridden position;
   the retracted position is in an inboard direction of the base, relative to the erect position;
   the overridden position is in an outboard direction of the base, relative to the erect position;
   the first overrideable guide/restraint, when in the erect position or in the overridden position, is urged by spring force in the inboard direction of the base and towards the retracted position; and
   the first overrideable guide/restraint is capable of being locked in place, when forced in the outboard direction and into the overridden position.

2. The centerline restraint according to claim 1, wherein:
   the first overrideable guide/restraint is configured to selectively either:
   (a) lock in place, when forced into the overridden position, or
   (b) spring back up, when forced into the overridden position.

3. The centerline restraint according to claim 2, further comprising:
   a second overrideable guide/restraint rotatably mounted on the base along a second rotational axis (B), the second rotational axis being spaced apart from the first rotational axis, wherein:
   the second overrideable guide/restraint is rotatable around the second rotational axis between a second retracted position, a second erect position and a second overridden position;
   the second retracted position is in a second inboard direction of the base, relative to the second erect position;
   the second overridden position is in a second outboard direction of the base, relative to the second erect position;
   the second overrideable guide/restraint, when in the erect position or in the overridden position, is urged by spring force in the second inboard direction of the base and towards the second retracted position; and
   the first overrideable guide/restraint is capable of being locked in place, when forced in the second outboard direction and into the second overridden position.

4. The centerline restraint according to claim 1, wherein:
   a portion of a vertical restraint belonging to the overrideable guide/restraint enters a cutout formed in the base, when the overrideable guide/restraint is in the overridden position.

5. A centerline restraint for an air cargo system, comprising:
   a base; and
   a first overrideable guide/restraint rotatably mounted on the base along a first rotational axis, wherein:
   the overrideable guide/restraint is rotatable around the first rotational axis between a retracted position, an erect position and an overridden position; and
   the base comprises at least one side wall provided with two pairs of detents arranged around a hole, a first pair of said two pairs of detents having a first depth in the side wall and a second pair of said two pairs of detents having a second depth in the side wall.

6. A centerline restraint for an air cargo system, comprising:
   a base; and
   a first overrideable guide/restraint rotatably mounted on the base along a first rotational axis, wherein:
   the overrideable guide/restraint is rotatable around the first rotational axis between a retracted position, an erect position and an overridden position; and
   the overrideable guide/restraint comprises:
   a guide body rotatable about the first rotational axis, the guide body having a first side and a second side that are axially spaced apart along the first rotational axis; and
   a vertical restraint secured to the guide body, wherein:
   the first side comprises a first channel having first and second stops that are spaced apart from one another; and
   the second side comprises a second channel having a third stop.

7. The centerline restraint according to claim 6, wherein:
   an end portion of a vertical restraint belonging to the overrideable guide/restraint enters a cutout formed in the base, when the overrideable guide/restraint is in the overridden position.

8. The centerline restraint according to claim 6, wherein:
   when the centerline restraint is mounted on a cargo floor, the overrideable guide/restraint has a sufficiently low profile so as to not interfere with the passing of a unit load device thereover, when the overrideable guide/restraint is in either the retracted position or the overridden position.

9. The centerline restraint according to claim 6, wherein:
   the first side comprises a first leg; and
   the second side comprises a second leg.

10. The centerline restraint according to claim 6, wherein:
    the first and second stops are at different axial depths and are spaced apart from one another along the first channel.

11. The centerline restraint according to claim 6, wherein:
    the first channel comprises a shallow first track terminating in the first stop and a deep second track terminating in the second stop.

12. The centerline restraint according to claim 11, wherein:
    the second stop is farther inward along the first rotational axis than the first stop.

13. The centerline restraint according to claim 11, wherein:
    the second channel comprises a shallow third track terminating in the third stop; and
    the shallow third track and the shallow first track have approximately the same depth.

14. The centerline restraint according to claim 13, wherein:
    the third stop and the first stop are approximately the same distance inward along the first rotational axis from their respective sides.

15. The centerline restraint according to claim 6, further comprising:
    a first plunger configured to selectively abut the first and second stops depending on the position of the overrideable guide/restraint; and
    a second plunger configured to selectively abut the third stop depending on the position of the overrideable guide/restraint.

16. The centerline restraint according to claim 15, further comprising:
    first and second lift handles operatively connected to the first and second plungers, respectively, the first and second lift handles, when operated, configured to cause the overrideable guide/restraint to switch between one position and another.

* * * * *